US012688387B2

(12) United States Patent
Park et al.

(10) Patent No.: US 12,688,387 B2
(45) Date of Patent: Jul. 21, 2026

(54) PROVIDE INFORMATION ACCORDING TO STATUS OF DETECTION DEVICE

(71) Applicant: Hewlett-Packard Development Company, L.P., Spring, TX (US)

(72) Inventors: Jungkyu Park, Seongnam Si (KR); Sangcheol Kim, Seongnam Si (KR); Taewon Eom, Seongnam Si (KR); Yeontaek Jeong, Seongnam Si (KR); Jewon Jeong, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 287 days.

(21) Appl. No.: 18/683,898

(22) PCT Filed: Jan. 25, 2022

(86) PCT No.: PCT/US2022/013613
§ 371 (c)(1),
(2) Date: Feb. 15, 2024

(87) PCT Pub. No.: WO2023/022749
PCT Pub. Date: Feb. 23, 2023

(65) Prior Publication Data
US 2025/0131223 A1 Apr. 24, 2025

(30) Foreign Application Priority Data
Aug. 18, 2021 (KR) ........................ 10-2021-0108805

(51) Int. Cl.
*G06K 15/00* (2006.01)

(52) U.S. Cl.
CPC ................................ *G06K 15/4085* (2013.01)

(58) Field of Classification Search
None
See application file for complete search history.

(56) References Cited

U.S. PATENT DOCUMENTS

| | | | |
|---|---|---|---|
| 5,823,529 A | 10/1998 | Mandel et al. | |
| 10,350,924 B2 | 7/2019 | Nicklos et al. | |
| 2004/0234316 A1 | 11/2004 | Matsuse | |
| 2014/0198329 A1* | 7/2014 | Guminski | G06K 15/1805 358/1.12 |
| 2019/0364169 A1* | 11/2019 | Iida | H04N 1/00281 |
| 2021/0245525 A1 | 8/2021 | Miura et al. | |

FOREIGN PATENT DOCUMENTS

| | | | |
|---|---|---|---|
| JP | 2003-146482 A | 5/2003 | |
| JP | 2011-137900 A | 7/2011 | |
| JP | 2018-202792 A | 12/2018 | |
| JP | 6781351 B1 | 11/2020 | |
| KR | 10-2002-0017363 A | 3/2002 | |

* cited by examiner

*Primary Examiner* — Lennin R Rodriguezgonzalez
(74) *Attorney, Agent, or Firm* — Foley & Lardner LLP

(57) ABSTRACT

An example image forming apparatus includes a detection device to detect loading of paper output from the image forming apparatus, a user interface device, a processor, and a memory to store instructions executable by the processor. The processor is to, by executing the instructions, detect a folded state or an unfolded state of the detection device, display state information indicating a state of the detection device on the user interface device, and control an operation of an image forming job based on the state information of the detection device and mounting information of an output option device.

14 Claims, 16 Drawing Sheets

Figure 11:
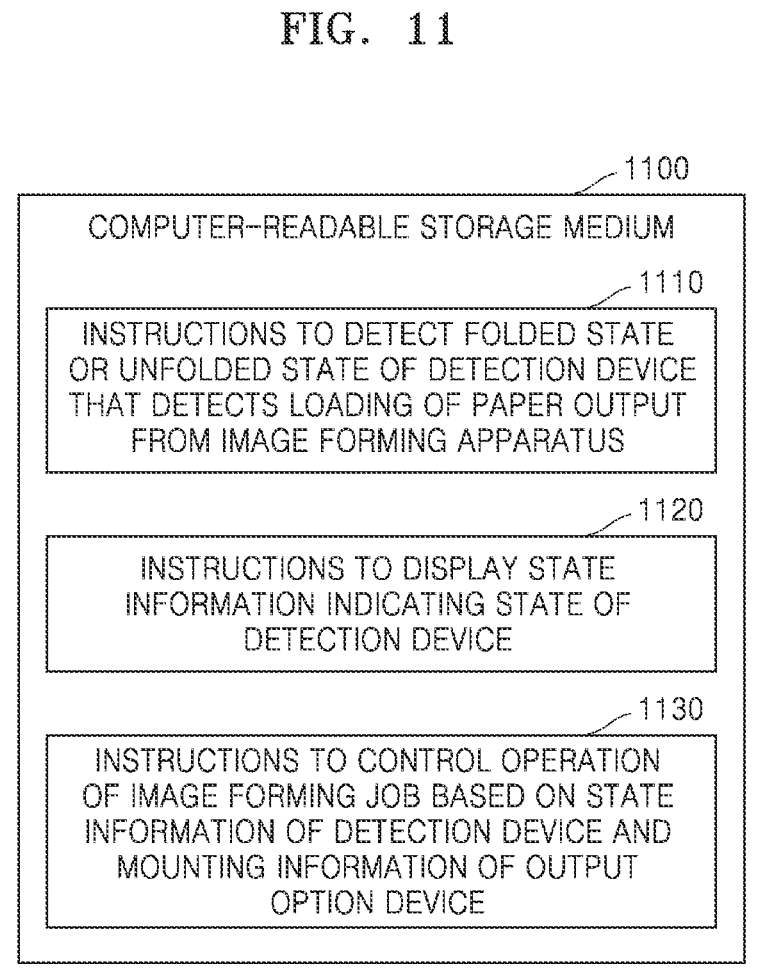

COMPUTER-READABLE STORAGE MEDIUM

1110

INSTRUCTIONS TO DETECT FOLDED STATE
OR UNFOLDED STATE OF DETECTION DEVICE
THAT DETECTS LOADING OF PAPER OUTPUT
FROM IMAGE FORMING APPARATUS

1120

INSTRUCTIONS TO DISPLAY STATE
INFORMATION INDICATING STATE OF
DETECTION DEVICE

1130

INSTRUCTIONS TO CONTROL OPERATION
OF IMAGE FORMING JOB BASED ON STATE
INFORMATION OF DETECTION DEVICE AND
MOUNTING INFORMATION OF OUTPUT
OPTION DEVICE

PROVIDE INFORMATION ACCORDING TO STATUS OF DETECTION DEVICE

BACKGROUND

Based on an image forming job being performed in an image forming apparatus, a phenomenon in which paper is jammed in the image forming apparatus may occur. There may be various causes for the phenomenon in which paper is jammed in the image forming apparatus. For example, during execution of the image forming job, paper may be wound on a fuser belt inside the image forming apparatus or paper may be jammed between a paper output unit and a finisher of the image forming apparatus. After removal of the paper jammed in the image forming apparatus, the image forming apparatus may operate normally.

BRIEF DESCRIPTION OF THE DRAWINGS

Various examples will be described below by referring to the following figures.

FIG. 11 is a diagram illustrating instructions stored in a non-transitory computer-readable storage medium according to an example.

DETAILED DESCRIPTION

Hereinafter, examples will be described with reference to the attached drawings. However, the disclosure may be implemented in various forms, and are not limited to the examples described herein.

An "image forming apparatus" may refer to any type of apparatus capable of performing an image forming job, such as a printer, a copier, a scanner, a fax machine, a multi-function printer (MFP), a display device, etc. The image forming apparatus may be a two-dimensional (2D) image forming apparatus or a three-dimensional (3D) image forming apparatus. The "image forming job" may refer to a job related to printing, copying, scanning, faxing, storage, transmission, coating, etc., and may be a job combining two or more of the above-listed jobs.

A "detection device" may refer to a device to detect loading of paper output from the image forming apparatus. For example, the detection device may include an actuator to perform detection of paper loaded in a paper exit and a sensor to detect a state of the actuator. The detection device may include at least one member to connect the actuator with the sensor. The detection device may provide for manipulation of the state of the actuator between an unfolded state and a folded state.

An "unfolded state of the detection device" may refer to a state in which the actuator in the detection device is unfolded. For example, the unfolded state of the detection device may refer to a state in which the actuator is unfolded toward a stacker tray. The unfolded state of the detection device may also refer to a state in which the actuator protrudes toward the stacker tray. In the unfolded state of the detection device, the actuator may be in an activated state. In the activated state of the actuator, the actuator may detect an amount of loaded paper.

A "folded state of the detection device" may refer to a state in which the actuator in the detection device is folded. For example, the folded state of the detection device may refer to a state in which the actuator is folded toward an inner side of the detection device and not protruding toward the stacker tray. In the folded state of the detection device, the actuator may be in a deactivated state.

An "output option device" may be mounted in the image forming apparatus, and may process and post-process printed matters output through the image forming job. For example, the output option device may be referred to as a finisher.

Figure 1:
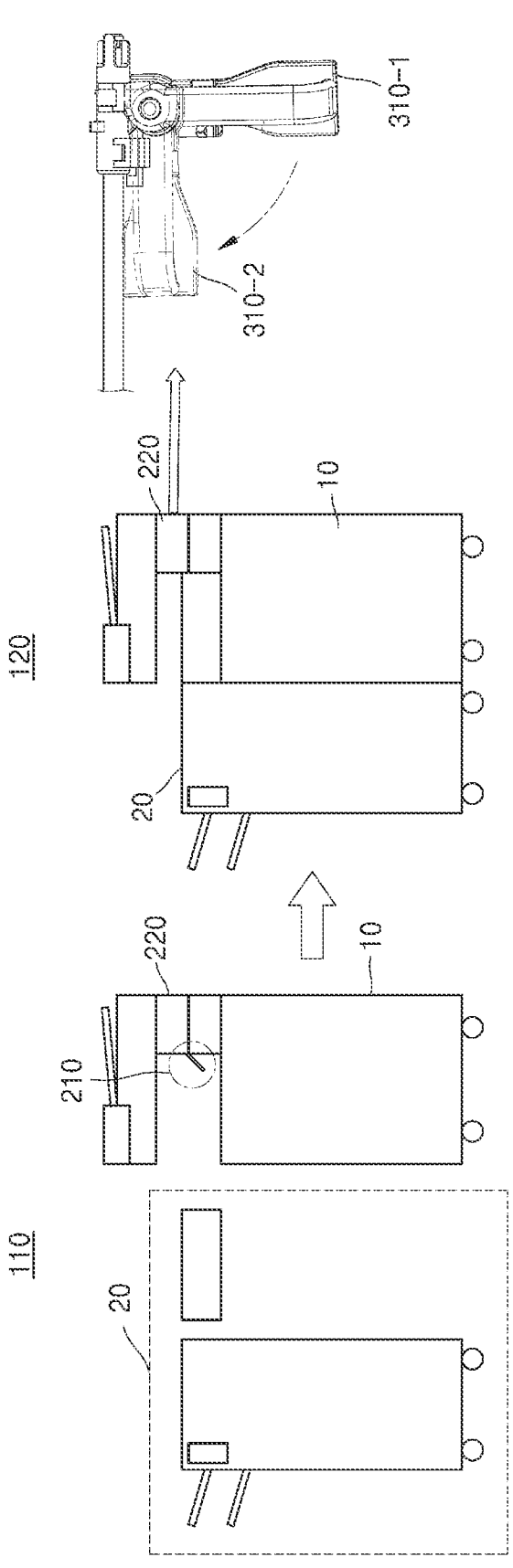
FIG. 1 is a conceptual diagram for describing an operating method of an image forming apparatus to provide state information of a detection device and guide information to guide a state change of the detection device based on an output option device being mounted in the image forming apparatus according to an example.

FIG. 1 is a conceptual diagram for describing an operating method of an image forming apparatus to provide state information of a detection device and guide information to guide a state change of the detection device based on an output option device being mounted in the image forming apparatus according to an example.

Referring to FIG. 1, an image 110 shows a state before an output option device 20 is mounted in (e.g., coupled to) an image forming apparatus 10. Before the output option device 20 is mounted in the image forming apparatus 10, an actuator of a detection device 210 may operate in an unfolded state thereof. The actuator of the detection device 210 may detect paper loaded in a stacker tray. The actuator of the detection device 210 may detect whether an amount of loaded paper exceeds a preset amount, and a user interface device 220 may display a detection result.

In FIG. 1, an image 120 shows a state after the output option device 20 is mounted in the image forming apparatus 10. To avoid the output option device 20 from being mounted in a state in which the actuator of the detection device 210 is in the unfolded state, the user interface device 220 may display at least one of error information that indicates an error state regarding the detection device 210 or guide information to guide a folding of the actuator of the detection device 210.

For example, the error information may be displayed in the form of a message or provided in the form of a notification by a light-emitting device, as information indicating the unfolded state of the detection device 210. The guide information may be information to guide a change of a state of the actuator of the detection device 210 from an unfolded state 310-1 to a folded state 310-2. For example, the user interface device 220 may display a video or an image showing that the actuator of the detection device 210 is changed from the unfolded state 310-1 to the folded state 310-2.

In a situation in which the output option device 20 is mounted in a state in which the actuator of the detection device 210 is in the unfolded state, paper output through the image forming job may be jammed by the actuator of the detection device 210. In that case, the paper jam may be avoided or reduced by providing the state information of the detection device 210, the error information regarding the detection device 210, and the guide information in advance. Moreover, by avoiding or preventing the paper jam, the number of service calls may be reduced.

Figure 2:
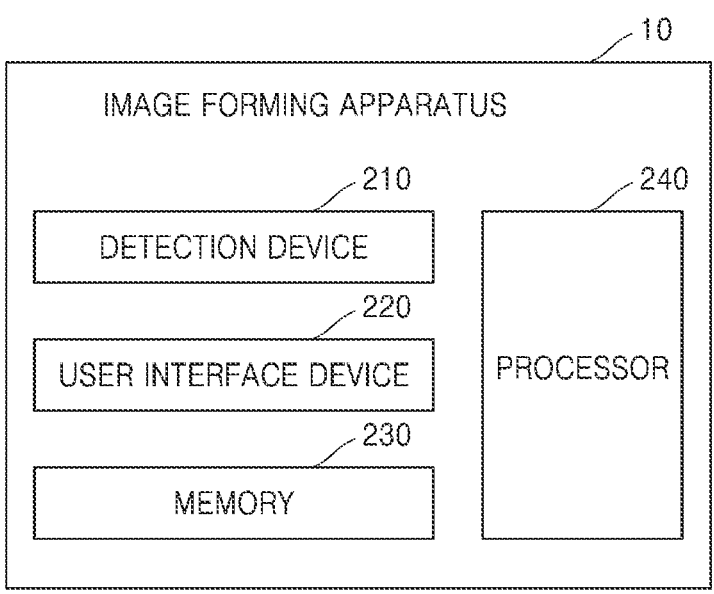
FIG. 2 is a block diagram illustrating an image forming apparatus according to an example.

FIG. 2 is a block diagram of an image forming apparatus according to an example.

Referring to FIG. 2, the image forming apparatus 10 may include the detection device 210, the user interface device 220, a memory 230, and a processor 240. However, the image forming apparatus 10 may include more or fewer components than the shown components. Hereinafter, examples of the components will be described.

The detection device 210 may detect loading of paper output from the image forming apparatus 10. For example, the detection device 210 may include an actuator, a sensor, a first lever, a second lever, and a bar.

For example, the actuator may detect loading of paper output from the image forming apparatus 10. For example, the sensor may detect the unfolded state or the folded state of the actuator. For example, the unfolded state of the actuator may refer to a state in which the actuator is unfolded toward the stacker tray. For example, the folded state of the actuator may refer to a state in which the actuator is folded in a direction away from the stacker tray.

For example, the first lever may be coupled to the actuator. The first lever may rotate or fix the actuator. For example, the second lever may be coupled to the sensor. The second lever may control an on or off operation of the sensor.

For example, the bar may include a first portion coupled to the first lever and a second portion coupled to the second lever. An example structure of the detection device 210 will be described with reference to FIG. 3.

The user interface device 220 may include an input unit to receive an input for controlling an operation of the image forming apparatus 10 from the user, or the like, and an output unit to display information such as a result of performing the operation of the image forming apparatus 10, a state of the image forming apparatus 10, or the like. For example, the user interface device 220 may include an operation panel to receive a user input, a display panel to display a screen, and so forth.

As an example, the input unit may include any of various devices capable of receiving a user input, such as a keyboard, a physical button, a touch screen, a camera, a microphone, etc. The output unit may include, for example, the display panel, the speaker, etc. However, the user interface device 220 may also include any of various devices that support input and output, without being limited to the foregoing examples.

The memory 230 may store machine readable instructions, a program, or the like. For example, the memory 230 may store machine readable instructions for an operating method of the image forming apparatus 10 to display a state of detecting the folded state or the unfolded state of the detection device 210 and control an operation of an image forming job based on the state of the detection device 210 and a state regarding mounting of the output option device 20.

The memory 230 may include a storage medium of at least one type among a flash memory type, a hard disk type, a multimedia card micro type, a card type memory (e.g., a secure digital (SD), extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, an optical disk, or the like.

The processor 240 may control an operation of the image forming apparatus 10, and may include at least one processor such as a central processing unit (CPU), or the like. The processor 240 may include at least one processor specialized for each function or may be a processor in an integral form.

The processor 240 may execute a program stored in the memory 230, read data or a file stored in the memory 230, or store new data or a new file in the memory 230. The processor 240 may, by executing instructions stored in the memory 230, detect the folded state or the unfolded state of the detection device 210 that detects loading of paper output from the image forming apparatus 10, display state information indicating the state of the detection device 210, and control an operation of an image forming job based on the state information of the detection device 210 and mounting information of the output option device 20.

For example, the processor 240 may detect the folded state or the unfolded state of the detection device 210. The user interface device 220 may display the state information indicating the state of the detection device 210. The processor 240 may control the operation of the image forming job based on the state information of the detection device 210 and the mounting information of the output option device 20.

For example, the processor 240 may detect whether the detection device 210 is in an error state based on the state information of the detection device 210 and the mounting information of the output option device 20. Based on the detection device 210 being detected to be in the error state, the processor 240 may display at least one of the error information indicating the error state regarding the detection device 210 and guide information to clear the error state on the user interface device 220.

For example, the state information of the detection device 210 may indicate the folded state, and the mounting information of the output option device 20 may indicate the mounted state. In this case, the actuator of the detection device 210 is not unfolded toward the stacker tray, such that a paper jam caused by the actuator may not occur in a print job of the image forming apparatus 10. Upon receipt of a print job request, the processor 240 may detect the state of the detection device 210 as a normal state and perform the print job corresponding to the print job request.

For example, the state information of the detection device 210 may indicate the unfolded state, and the mounting information of the output option device 20 may indicate the mounted state. In this case, the actuator of the detection device 210 is unfolded toward the stacker tray, such that a paper jam caused by the actuator may occur in the print job of the image forming apparatus 10. Thus, the actuator may be adjusted so as not to protrude toward the stacker tray before the print job is performed. The processor 240 may detect the state of the detection device 210 as the error state. The processor 240 may display the error information indicating the error state regarding the detection device 210 or guide information to guide folding on the user interface device 220. Using the guide information, the user may fold the actuator protruding toward the stacker tray. Based on the folded state of the actuator being detected, the image forming apparatus 10 may detect the state of the detection device 210 as a normal state and perform a print job corresponding to the print job request.

For example, a paper jam may occur in the image forming apparatus 10 in which the output option device 20 is mounted. To clear the paper jam, the user may separate the output option device 20 from the image forming apparatus 10. The user may remove the paper jammed in the image forming apparatus 10. The image forming apparatus 10 may display the state information of the detection device 210. For example, the state information of the detection device 210 may indicate the folded state or the unfolded state of the detection device 210.

The user interface device 220 may display mounting notification information of the output option device 20 or guide information to guide folding of the detection device 210, based on the state information of the detection device 210. For example, based on the state information of the detection device 210 indicating the folded state, the user interface device 220 may display the mounting notification information of the output option device 20. The user may mount the output option device 20 in the image forming apparatus 10 according to a notification device. For example, based on the state information of the detection device 210 indicating the unfolded state, the user interface device 220 may display guide information to guide folding of the detection device 210. The user may adjust the actuator of the detection device 210 not to protrude toward the stacker tray. Based on the folded state of the detection device 210 being detected after adjustment of the actuator, the user interface device 220 may display the mounting notification information of the output option device 20. The user may mount the output option device 20 in the image forming apparatus 10 according to a notification device.

For example, a paper jam may occur in the image forming apparatus 10 in which the output option device 20 is not mounted. The user may remove the paper jammed in the image forming apparatus 10. The user interface device 220 may display the state information of the detection device 210. For example, the state information of the detection device 210 may indicate the folded state or the unfolded state of the detection device 210.

Based on the output option device 20 not being mounted in the image forming apparatus 10, the detection device 210 may normally detect paper loaded in the stacker tray in a case in which the actuator of the detection device 210 is maintained unfolded toward the stacker tray.

Thus, upon detection of the unfolded state of the detection device 210, the processor 240 may perform the print job corresponding to the print job request. Based on the folded state of the detection device 210 being detected, the user interface device 220 may display guide information to guide the unfolded state of the detection device 210. The user may adjust the actuator of the detection device 210 to protrude toward the stacker tray. After adjustment of the actuator, upon detection of the unfolded state of the detection device 210, the processor 240 may perform the print job corresponding to the print job request.

Figure 3:
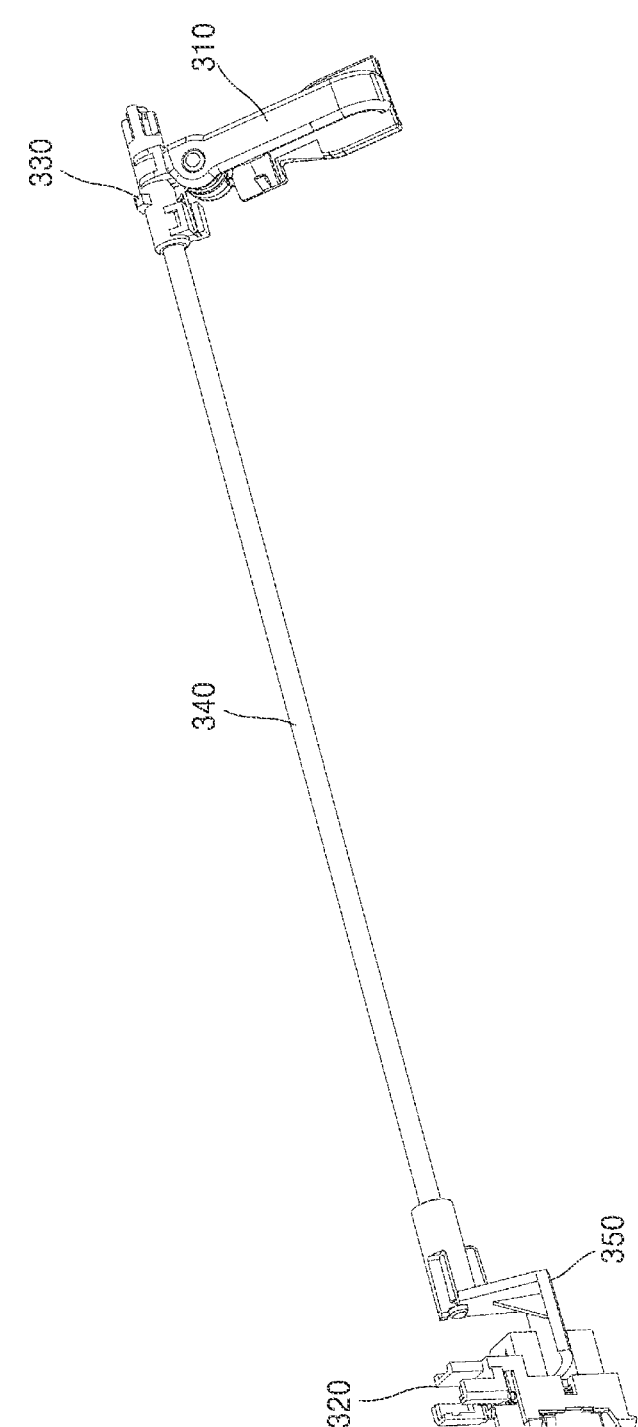
FIG. 3 is a block diagram illustrating a detection device according to an example.

FIG. 3 is a block diagram illustrating a detection device according to an example.

Referring to FIG. 3, the detection device 210 may include an actuator 310, a sensor 320, a first lever 330, a second lever 350, and a bar 340. However, the detection device 210 may be implemented by more or fewer components than the shown components. Hereinafter, examples of the components will be described.

For example, the actuator 310 may detect loading of paper output from the image forming apparatus 10. For example, the paper output from the image forming apparatus 10 through the print job may be loaded in the stacker tray. The actuator 310 may detect the paper loaded in the stacker tray. For example, the number of paper sheets loadable in the stacker tray may be preset. Based on a preset number of paper sheets loaded in the stacker tray being detected through the actuator 310, the user interface device 220 may display a message requesting organization of the paper loaded in the stacker tray. For example, the actuator 310 may be coupled to the first lever 330 and may be a foldable type. For example, based on the actuator 310 protruding toward the stacker tray, the state of the actuator 310 may be detected as the unfolded state. Based on the actuator 310 being in parallel to the bar 340 without protruding toward the stacker tray, the state of the actuator 310 may be detected as the folded state.

For example, the actuator 310 may be a foldable type so as to be manipulated between the unfolded state and the folded state. As the actuator 310 is a foldable type, the output option device 20 may be mounted in the image forming apparatus 10 without removing the actuator 310. Moreover, as the actuator 310 is a foldable type, the risk of loss may be avoided.

Depending on whether the output option device 20 is mounted in the image forming apparatus 10, the state of the actuator 310 may be adjusted differently. For example, based on the output option device 20 being mounted in the image forming apparatus 10, the actuator 310 may be adjusted to be in the folded state. That is, based on the actuator 310 being in the folded state, the probability of a paper jam caused by the actuator 310 occurring may be reduced. For example, based on the output option device 20 not being mounted in the image forming apparatus 10, the actuator 310 may be adjusted to be in the unfolded state. The actuator 310 may normally detect an amount of paper loaded in the stacker tray.

The sensor 320 may detect the state of the detection device 210. For example, the sensor 320 may generate a signal based on the state of the detection device 210. For example, based on the actuator 310 being in the unfolded state, the sensor 320 may maintain an on state. On the other hand, based on the actuator 310 being in the folded state, the sensor 320 may maintain an off state.

In an example, the first lever 330 may be coupled to the actuator 310 and rotate or fix the actuator 310. For example, based on the actuator 310 rotating, the first lever 330 may also rotate. In addition, based on the actuator 310 being adjusted to be in the unfolded state or the folded state, the first lever 330 may fix the actuator 310 such that the actuator 310 does not move. The second lever 350 may be coupled to the sensor 320. The bar 340 may include a first portion coupled to the first lever 330 and a second portion coupled to the second lever 350.

For example, the unfolded state of the detection device 210 may refer to a state in which the actuator 310 is unfolded toward the stacker tray. For example, based on the actuator 310 and the bar 340 being perpendicular to each other, the state of the detection device 210 may be the unfolded state.

For example, the folded state of the detection device 210 may refer to a state in which the actuator 310 is folded so as not to protrude toward the stacker tray. For example, based on the actuator 310 and the bar 340 being in parallel with each other, the state of the detection device 210 may be the folded state.

Figure 4A:
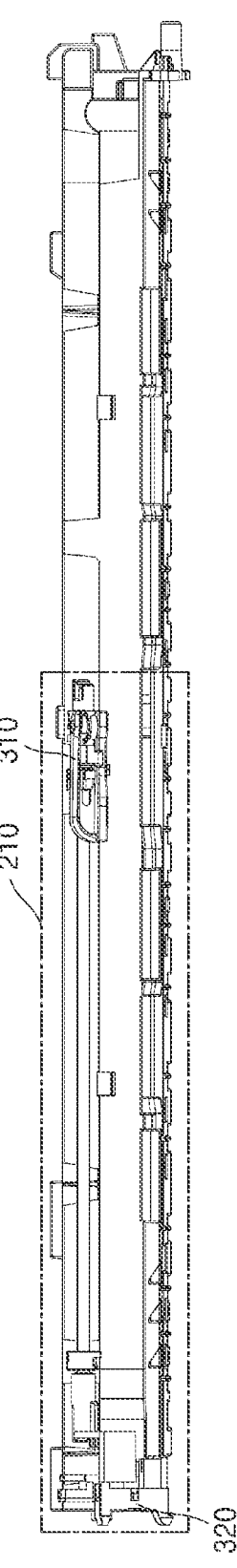
FIGS. 4A through 4C are diagrams illustrating a case in which a detection device is in a folded state according to an example.
Figure 4B:
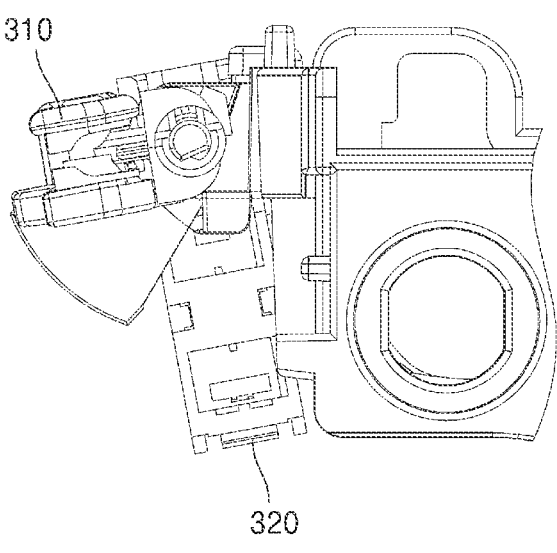
Figure 4C:
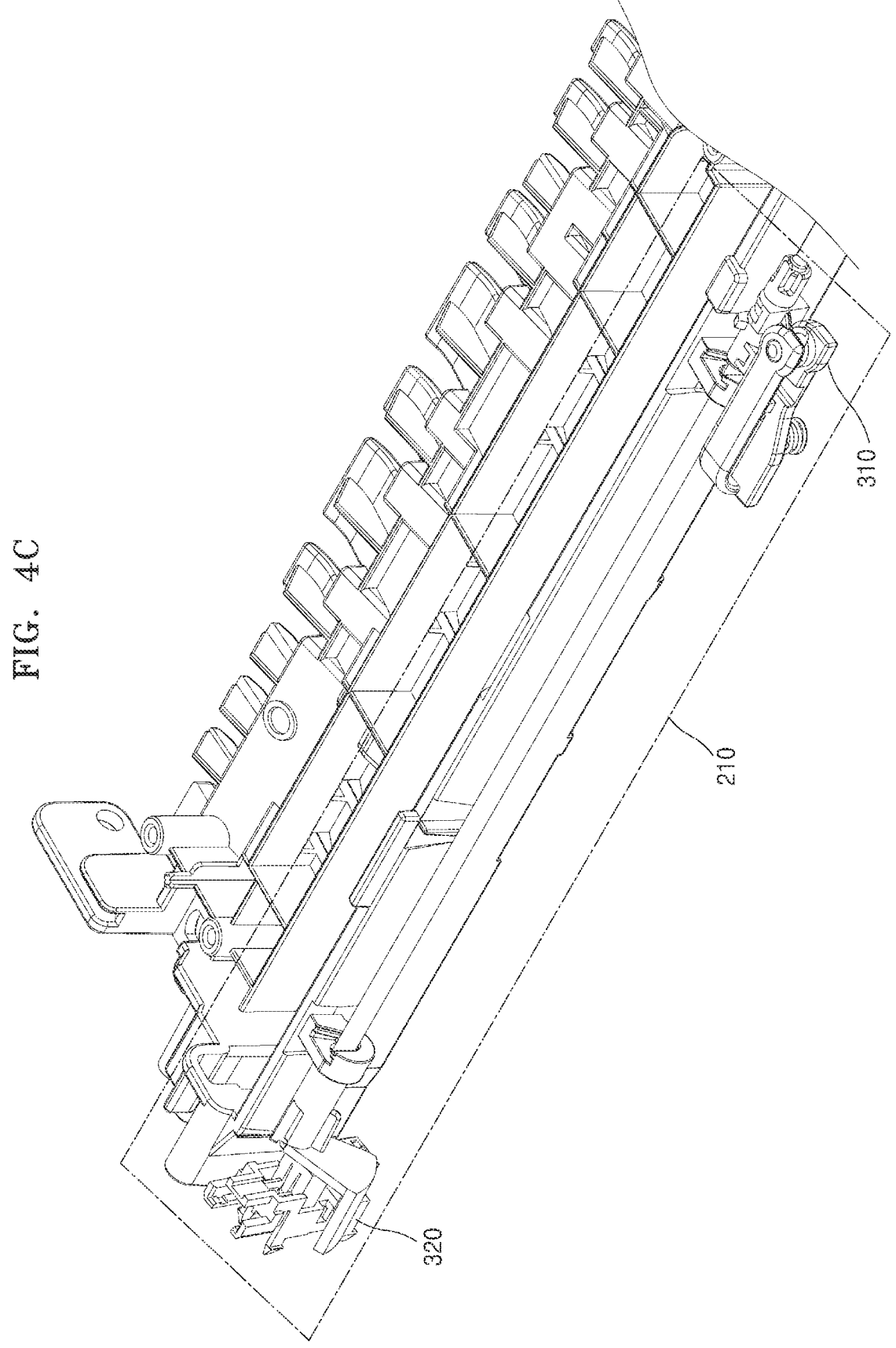

FIGS. 4A through 4C are diagrams illustrating a case in which a detection device is in the folded state according to an example.

FIG. 4A shows a case in which the detection device 210 is in the folded state. As shown in FIG. 4A, based on the actuator 310 being folded, the actuator 310 may not protrude toward the stacker tray. Thus, the output option device 20 may be mounted in the image forming apparatus 10 and paper running may be enabled.

FIGS. 4B and 4C show a side view and a perspective view of a case in which the detection device 210 is in the folded state. For example, the sensor 320 may detect the state of the actuator 310 based on at least one of a signal transmitted to or received from the outside. For example, based on the actuator 310 being in the folded state, the sensor 320 may operate in the off state. Based on the sensor 320 being in the off state, the processor 240 may detect the state of the detection device 210 as the folded state. The image forming apparatus 10 may display information indicating that the state of the detection device 210 is the folded state. The user may detect that the state of the detection device 210 is the folded state, and mount the output option device 20 in the image forming apparatus 10.

Figure 5A:
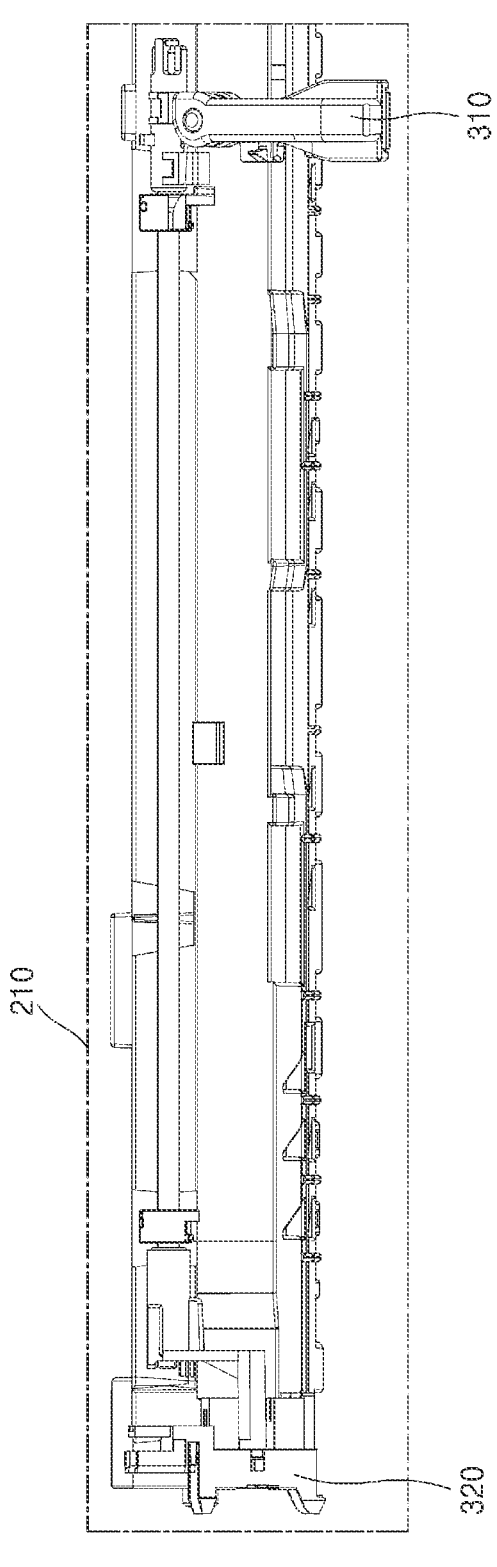
FIGS. 5A through 5C are diagrams illustrating a case in which a detection device is in an unfolded state according to an example.
Figure 5B:
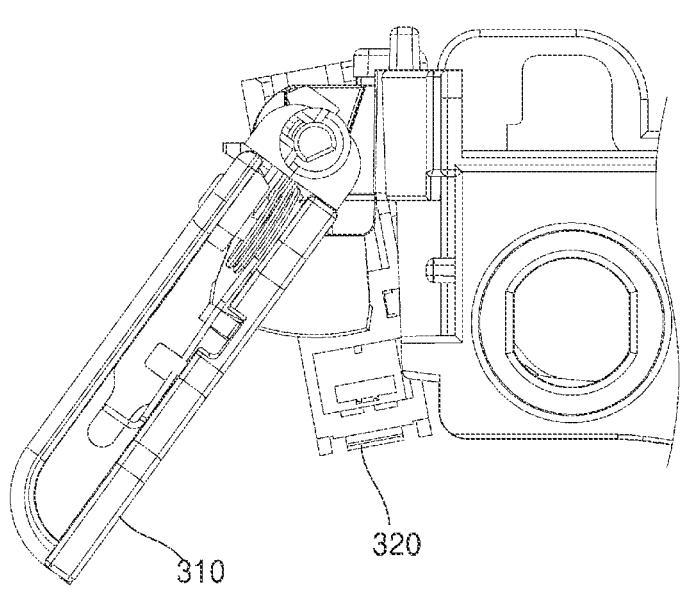
Figure 5C:
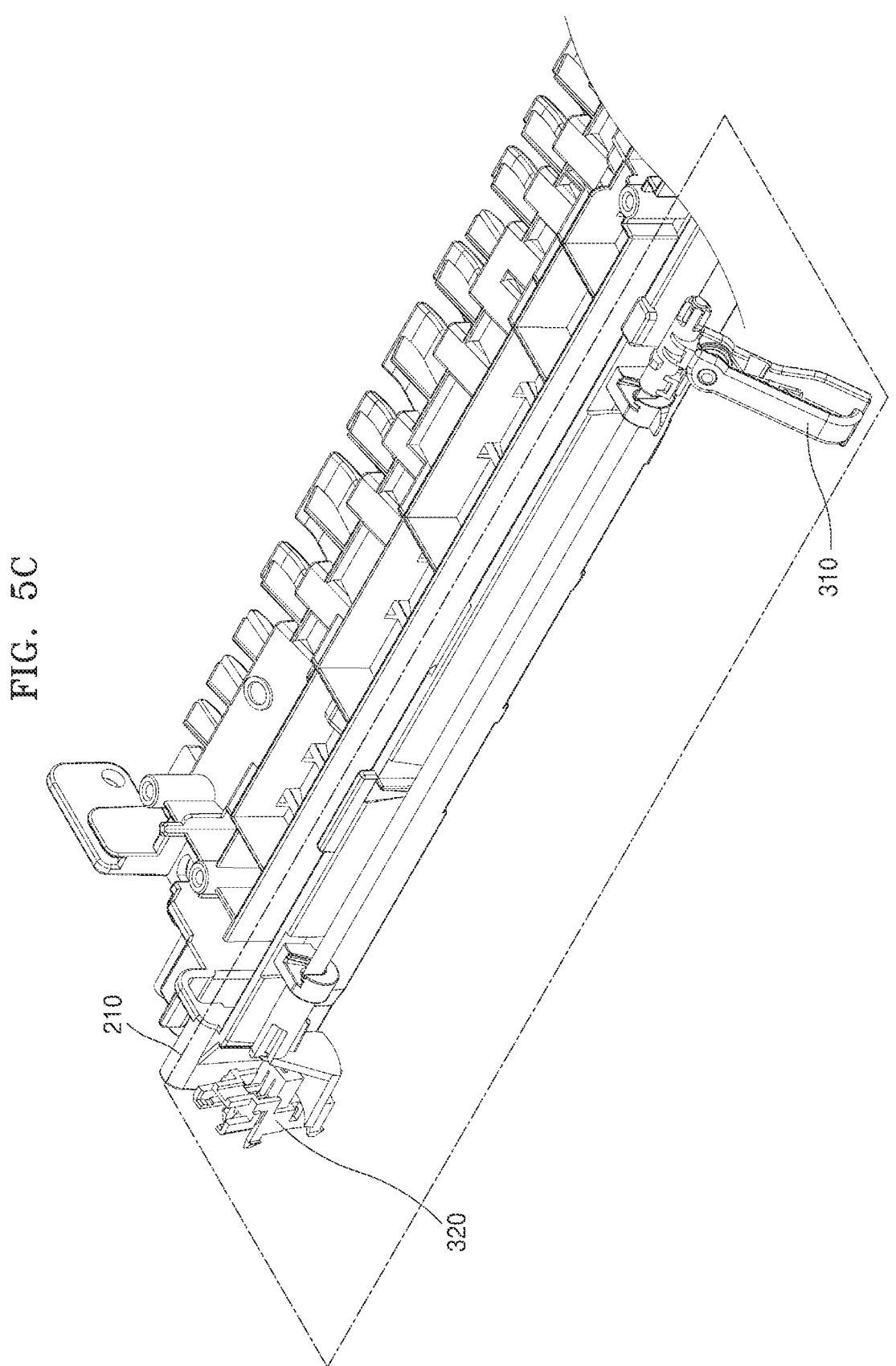

FIGS. 5A through 5C are diagrams illustrating a case in which a detection device is in an unfolded state according to an example.

FIG. 5A shows a case in which the detection device 210 is in the unfolded state. As shown in FIG. 5A, based on the actuator 310 being unfolded, the actuator 310 may protrude toward the stacker tray.

FIGS. 5B and 5C show a side view and a perspective view of a case in which the detection device 210 is in the unfolded state. For example, based on the actuator 310 being in the unfolded state, the sensor 320 may operate in the on state. Based on the sensor 320 being in the on state, the processor 240 may detect the state of the detection device 210 as the unfolded state. The image forming apparatus 10 may display information indicating that the state of the detection device 210 is the unfolded state. To mount the output option device 20 in the image forming apparatus 10, the user may change the unfolded state of the detection device 210 into the folded state and mount the output option device 20 in the image forming apparatus 10.

Figure 6A:
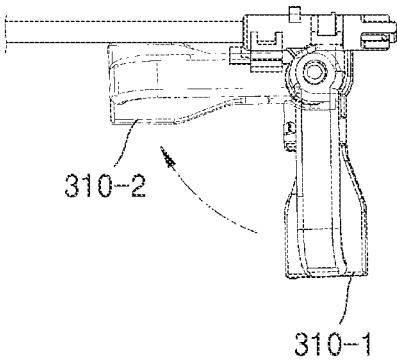
FIGS. 6A and 6B are diagrams for describing guide information to guide a state change of a detection device according to an example.
Figure 6B:
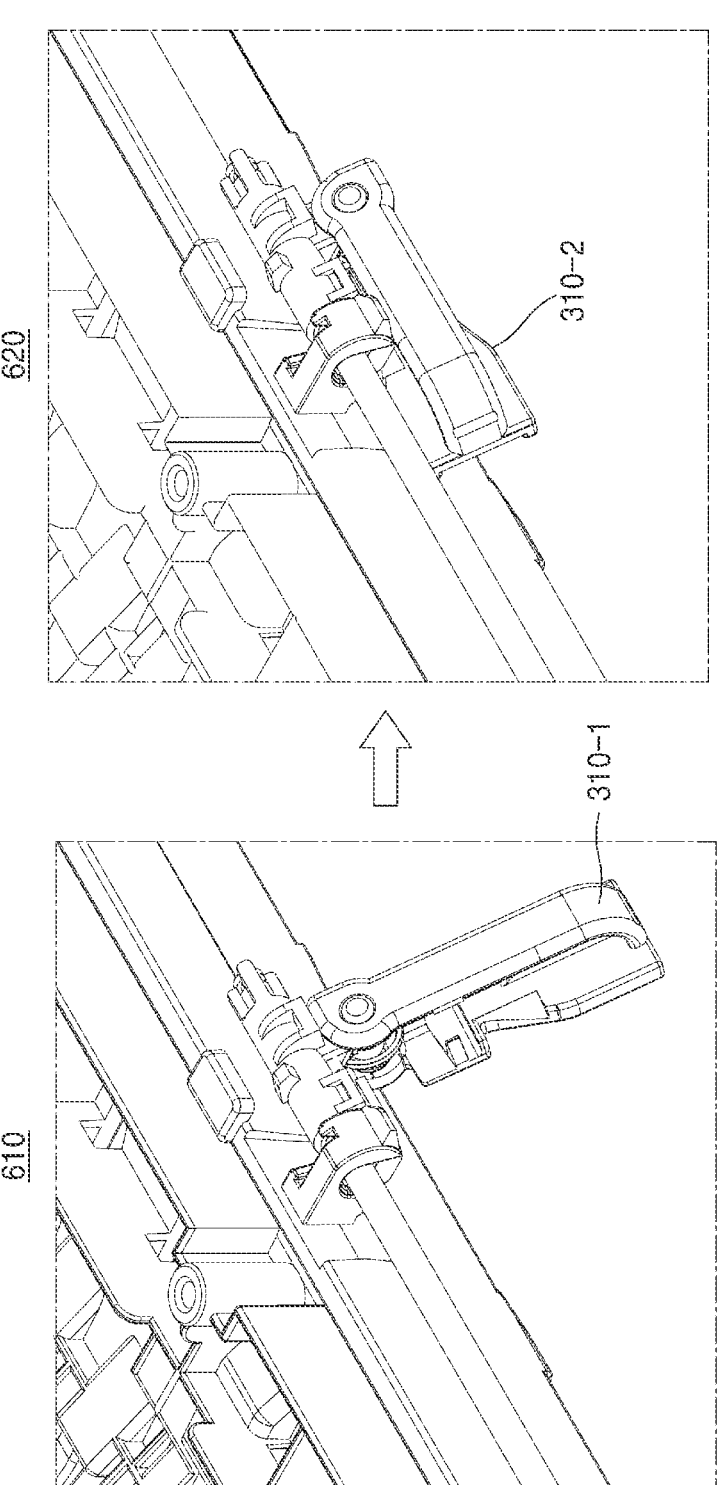

FIGS. 6A and 6B are diagrams for describing guide information to guide a state change of a detection device according to an example.

Based on the output option device 20 being mounted in the image forming apparatus 10 in a state in which the actuator 310 is in the unfolded state, a paper jam may occur due to the actuator 310. Thus, before the output option device 20 is mounted in the image forming apparatus 10, the actuator 310 of the detection device 210 may be manipulated to be in the folded state. The image forming apparatus 10 may display guide information to change the state of the detection device 210. For example, the image forming apparatus 10 may display an image showing a change from an unfolded state 310-1 of the detection device 210 to a folded state 310-2 of the detection device 210.

Referring to FIG. 6A, the image forming apparatus 10 may display an image in which an operation of a change from the unfolded state 310-1 of the detection device 210 to the folded state 310-2 of the detection device 210 is repeated.

Referring to FIG. 6B, the image forming apparatus 10 may display an image 610 showing the unfolded state 310-1 of the detection device 210 and after an elapse of a preset time, display an image 620 showing the folded state 310-2 of the detection device 210.

For example, based on the output option device 20 being mounted in the image forming apparatus 10, the image forming apparatus 10 may display the image shown in FIG. 6A or the images 610 and 620 shown in FIG. 6B.

In an example, based on the image forming apparatus 10 being used in a state in which the output option device 20 is removed from the image forming apparatus 10, upon detection of the detection device 210 as the folded state, the image forming apparatus 10 may display guide information to guide a state change from the folded state 310-2 of the detection device 210 to the unfolded state 310-1 of the detection device 210.

Figure 7:
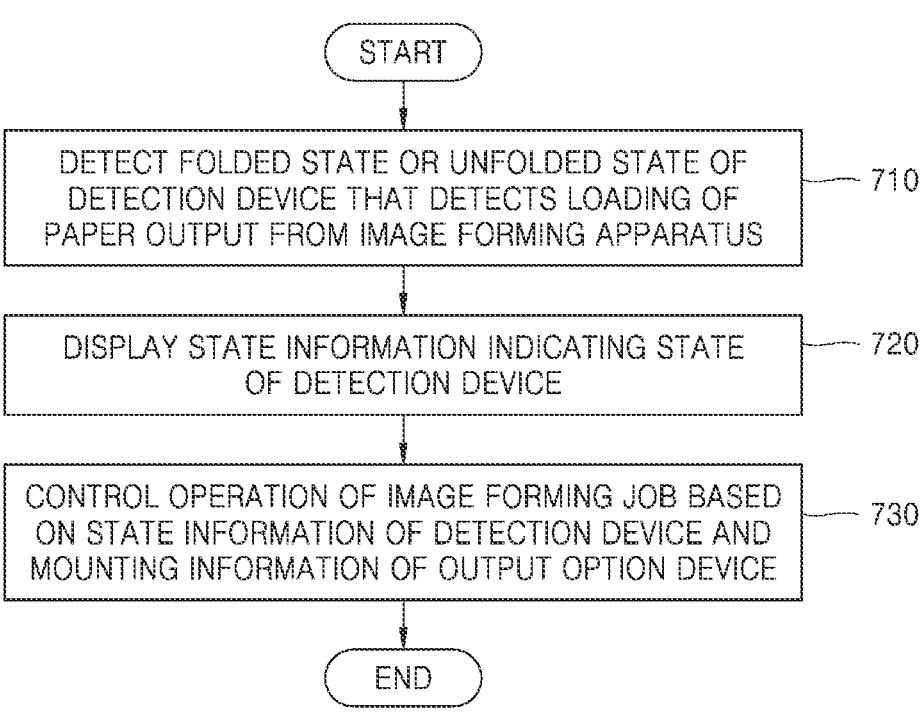
FIG. 7 is a flowchart of an operating method of an image forming apparatus based on a result of detecting a state of a detection device according to an example.

FIG. 7 is a flowchart of an operating method of an image forming apparatus based on a result of detecting a state of a detection device according to an example.

Referring to FIG. 7, the image forming apparatus 10 may detect the folded state or the unfolded state of the detection device 210 that detects loading of paper output from the image forming apparatus 10 in operation 710. For example, a sensor in the detection device 210 may detect the state of the detection device 210. For example, based on the detection device 210 being in the folded state, the sensor may operate in the off state. Based on the detection device 210 being in the unfolded state, the sensor may operate in the on state.

In operation 720, the image forming apparatus 10 may display state information indicating the state of the detection device 210. For example, the image forming apparatus 10 may display the state information of the detection device 210 in the form of a message. Based on a light-emitting device being included in the image forming apparatus 10, the image forming apparatus 10 may provide the state information of the detection device 210 through an on operation or an off operation of a light-emitting device. The image forming apparatus 10 may also provide the state information of the detection device 210 through a color of light emitted from the light-emitting device.

In operation 730, the image forming apparatus 10 may control the operation of the image forming job based on the state information of the detection device 210 and the mounting information of the output option device 20.

For example, the state information of the detection device 210 may indicate the folded state, and the mounting information of the output option device 20 may indicate the mounted state. The image forming apparatus 10 may detect the state of the detection device 210 as a normal state and perform the print job corresponding to the print job request.

For example, the state information of the detection device 210 may indicate the unfolded state, and the mounting information of the output option device 20 may indicate the mounted state. The image forming apparatus 10 may detect the state of the detection device 210 as an error state and display at least one of the error information indicating the error state regarding the detection device 210 or the guide information to guide folding.

Figure 9:
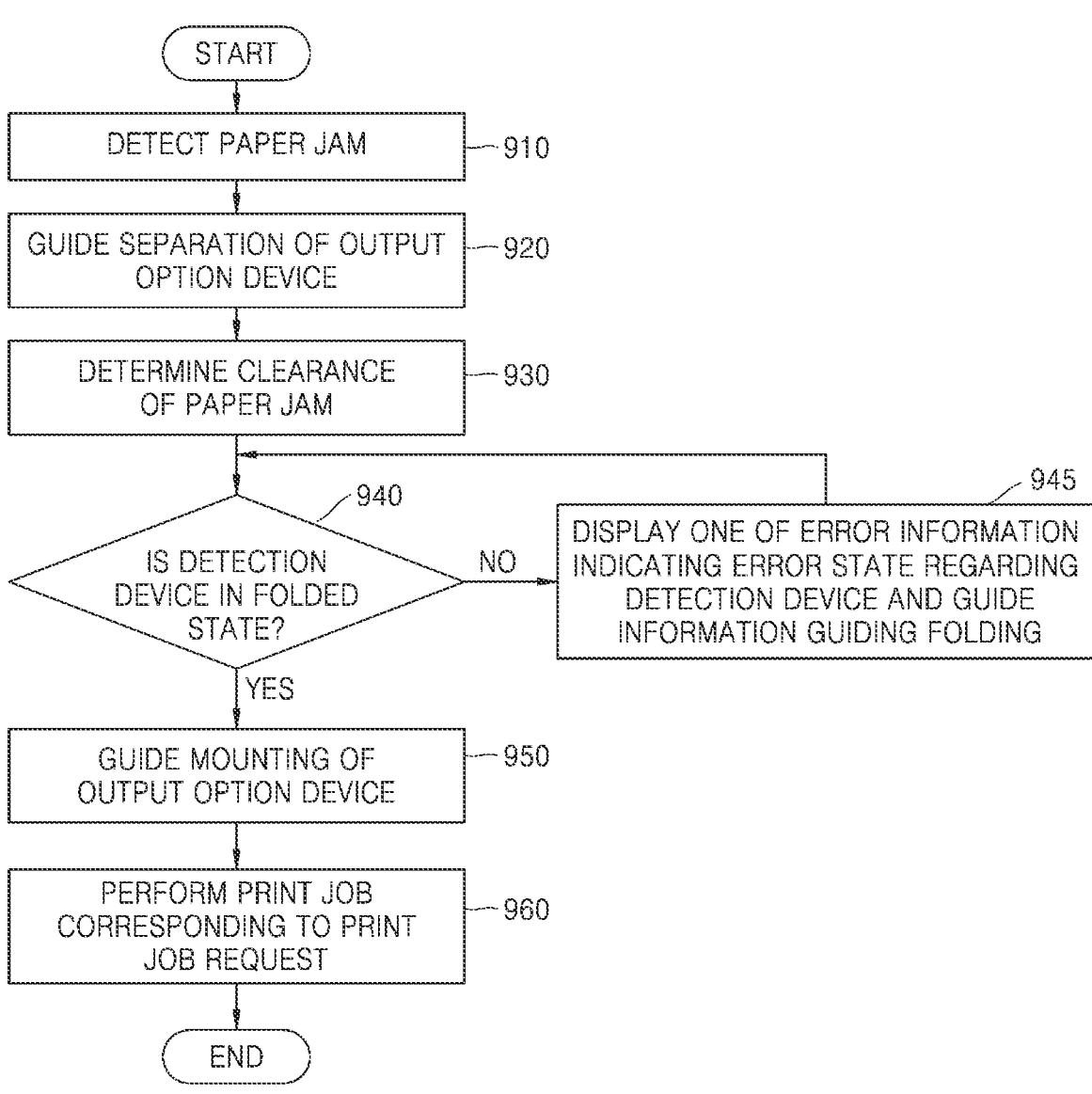
FIG. 9 is a flowchart of an operating method of an image forming apparatus in case of a paper jam according to an example.

For example, the mounting information of the output option device 20 may indicate the mounted state, and a paper jam may occur in the image forming apparatus 10. The user may remove paper jammed in the image forming apparatus 10. The image forming apparatus 10 may detect clearance of the paper jam. The image forming apparatus 10 may display mounting notification information of the output option device 20 or guide information to guide folding of the detection device 210, based on the state information of the detection device 210. With reference to FIG. 9, a description is made of an example operating method of the image forming apparatus 10 in case of a paper jam in the image forming apparatus 10 in which the output option device 20 is mounted.

Figure 10:
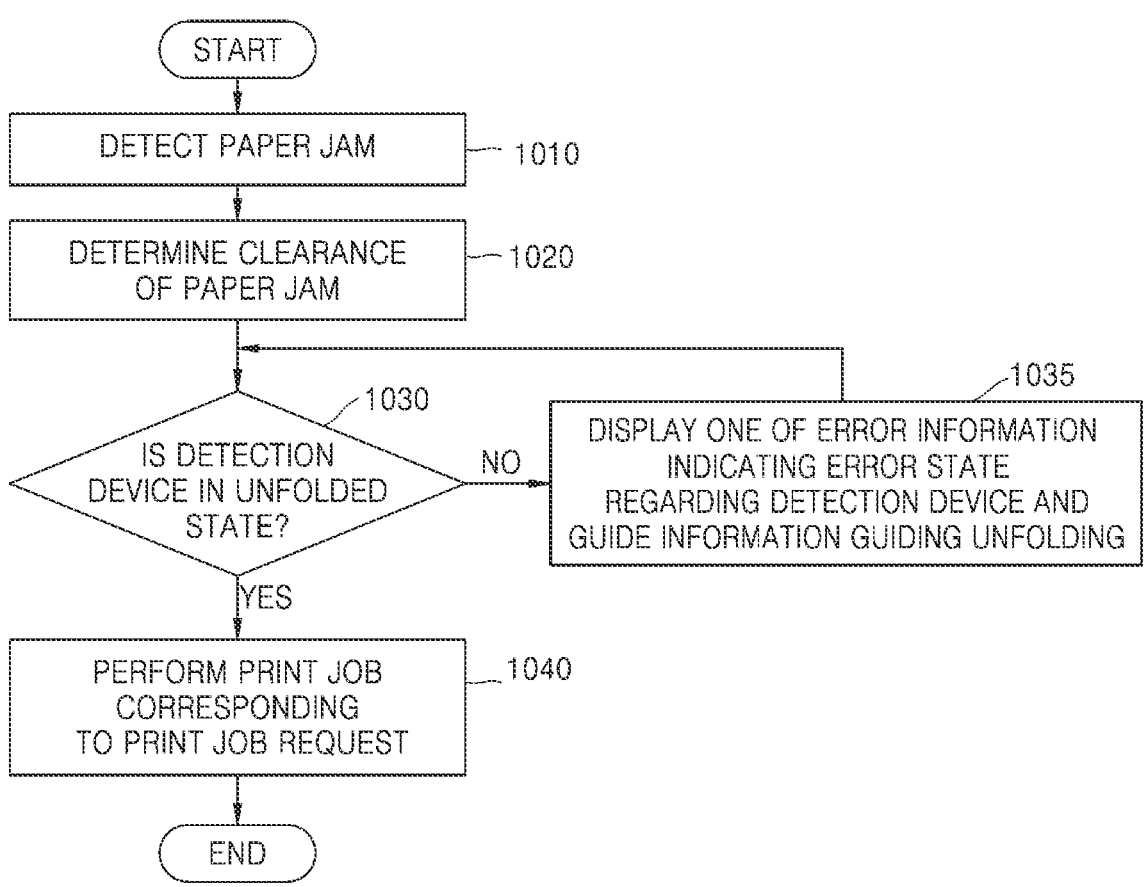
FIG. 10 is a flowchart of an operating method of an image forming apparatus in case of a paper jam according to an example.

For example, the mounting information of the output option device 20 may indicate a non-mounted state, and a paper jam may occur in the image forming apparatus 10. The user may remove paper jammed in the image forming apparatus 10. The image forming apparatus 10 may detect clearance of the paper jam. Based on the state information of the detection device 210 indicating the unfolded state, the image forming apparatus 10 may perform the print job corresponding to the print job request. Based on the state information of the detection device 210 indicating the folded state, the image forming apparatus 10 may display guide information to guide unfolding of the detection device 210. With reference to FIG. 10, a description is made of an example operating method of the image forming apparatus 10 in case of a paper jam in the image forming apparatus 10 in which the output option device 20 is not mounted.

Figure 8:
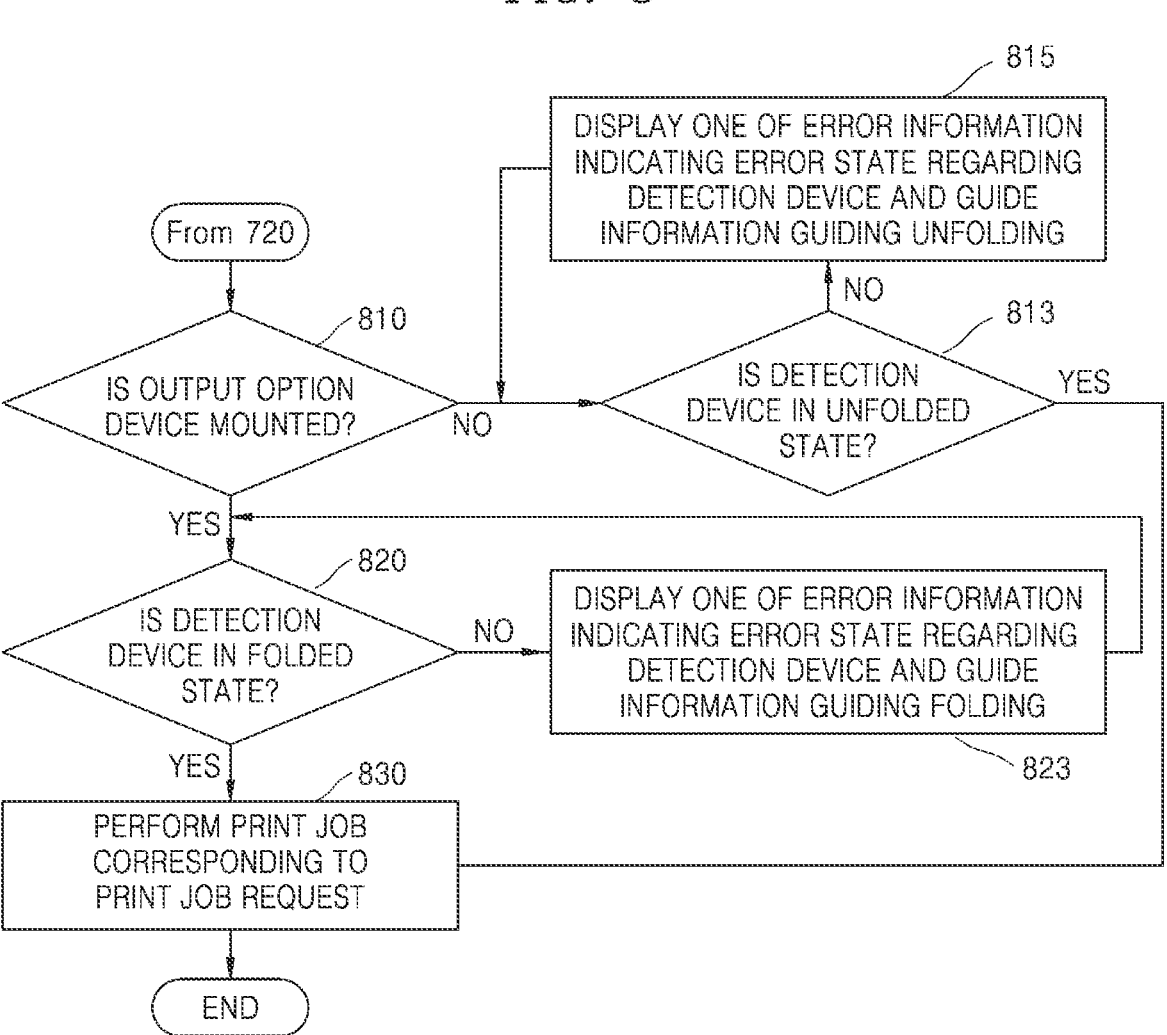
FIG. 8 is a flowchart of an operating method of an image forming apparatus based on mounting information of an output option device and state information of a detection device according to an example.

FIG. 8 is a flowchart of an operating method of an image forming apparatus based on mounting information of an output option device and state information of a detection device according to an example.

Referring to FIG. 8, the image forming apparatus 10 may detect whether the output option device 20 is mounted in the image forming apparatus 10 in operation 810. Based on the output option device 20 being mounted in the image forming apparatus 10, operation 820 may be performed. On the other hand, based on the output option device 20 not being mounted in the image forming apparatus 10, operation 813 may be performed.

In operation 813, the image forming apparatus 10 may detect whether the detection device 210 is in the unfolded state. Based on the detection device 210 being in the unfolded state, the image forming apparatus 10 may perform the print job corresponding to the print job request in operation 830. On the other hand, based on the detection device 210 being in the folded state, the image forming apparatus 10 may display error information indicating an error state regarding the detection device 210 or guide information to guide unfolding in operation 815.

In operation 820, the image forming apparatus 10 may detect whether the detection device 210 is in the folded state. Based on the detection device 210 being in the unfolded state, the image forming apparatus 10 may display error information indicating the error state regarding the detection device 210 or the guide information to guide folding in operation 823. On the other hand, based on the detection device 210 being in the folded state, the image forming apparatus 10 may perform the print job corresponding to the print job request in operation 830.

FIG. 9 is a flowchart of an operating method of an image forming apparatus in case of a paper jam according to an example.

For example, a paper jam may occur in the image forming apparatus 10 in which the output option device 20 is mounted. For example, after the image forming apparatus 10 detects clearance of a paper jam, the image forming apparatus 10 may provide the state information of the detection device 210 and provide guide information to guide a subsequent operation corresponding to the state information of the detection device 210.

Referring to FIG. 9, the image forming apparatus 10 may detect a state in which a paper jam occurs in the image forming apparatus 10 in operation 910. For example, the image forming apparatus 10 may display notification information notifying that paper is jammed inside the image forming apparatus 10.

In operation 920, the image forming apparatus 10 may display guide information to guide separation of the output option device 20. The user may separate the output option device 20 from the image forming apparatus 10. After separation of the output option device 20, the user may remove the jammed paper.

In operation 930, the image forming apparatus 10 may detect clearance of the paper jam.

In operation 940, the image forming apparatus 10 may detect whether the detection device 210 is in the folded state. Based on the detection device 210 being in the folded state, the image forming apparatus 10 may display information that guides mounting of the output option device 20 in operation 950. The user may mount the output option device 20 in the image forming apparatus 10.

On the other hand, based on the detection device 210 being in the unfolded state, the image forming apparatus 10 may display error information indicating an error state regarding the detection device 210 or guide information to guide folding in operation 945. For example, the user may fold the actuator of the detection device 210 having been unfolded toward the stacker tray. Thereafter, based on the detection device 210 being detected as being in the folded state, the image forming apparatus 10 may display information to guide mounting of the output option device 20 in operation 950. The user may mount the output option device 20 in the image forming apparatus 10.

In operation 960, the image forming apparatus 10 may perform the print job corresponding to the print job request.

FIG. 10 is a flowchart of an operating method of an image forming apparatus in case of a paper jam according to an example.

For example, a paper jam may occur in the image forming apparatus 10 in which the output option device 20 is not mounted. For example, after the image forming apparatus 10 detects clearance of the paper jam, the image forming apparatus 10 may provide the state information of the detection device 210 and provide guide information to guide a subsequent operation corresponding to the state information of the detection device 210.

Referring to FIG. 10, the image forming apparatus 10 may detect a state in which a paper jam occurs in the image forming apparatus 10 in operation 1010. For example, the image forming apparatus 10 may display notification information notifying that paper is jammed inside the image forming apparatus 10. The user may remove the jammed paper.

In operation 1020, the image forming apparatus 10 may detect clearance of the paper jam.

In operation 1030, the image forming apparatus 10 may detect whether the detection device 210 is in the unfolded state. Based on the detection device 210 being in the unfolded state, the image forming apparatus 10 may perform the print job corresponding to the print job request in operation 1040.

On the other hand, based on the detection device 210 being in the folded state, the image forming apparatus 10 may display error information indicating the error state regarding the detection device 210 or guide information to guide unfolding in operation 1035. For example, the user may unfold the folded actuator of the detection device 210 toward the stacker tray. Thereafter, based on the detection device 210 being detected as being in the unfolded state, the image forming apparatus 10 may perform the print job corresponding to the print job request in operation 1040.

FIG. 11 is a diagram illustrating instructions stored in a non-transitory computer-readable storage medium according to an example.

Referring to FIG. 11, a computer-readable storage medium 1100 may store instructions for an operating method of an image forming apparatus to display a state of detecting a folded state or an unfolded state of a detection device and control an operation of an image forming job based on the state of the detection device and a state regarding mounting of an output option device. For example, the computer-readable storage medium 1100 may store instructions 1110 to detect the folded state or the unfolded state of the detection device detecting loading of paper output from the image forming apparatus, instructions 1120 to display state information indicating the state of the detection device, and instructions 1130 to control an operation of the image forming job based on the state information of the detection device and the mounting information of the output option device.

In addition, an example operating method of an image forming apparatus may be implemented in the form of a non-transitory computer-readable storage medium having stored therein instructions or data executable by a computer or a processor. The foregoing disclosure may also be written as a program executable on a computer, and may be implemented on a general-purpose digital computer operating the program by using the non-transitory computer-readable storage media. Examples of the non-transitory computer-readable storage media may include read-only memory (ROM), random-access memory (RAM), flash memory, compact disc (CD)-ROMs, CD-recordables (CD-Rs), CD+Rs, CD-rewritable (RWs), CD+RWs, digital versatile disc (DVD)-ROMs, DVD-Rs, DVD+Rs, DVD-RWs, DVD+RWs, DVD-RAMs, Blue-ray (BD)-ROMs, BD-recordables (Rs), BD-R low-to-high (LTHs), BD-rewritable (REs), magnetic tapes, floppy disks, magneto-optical data storage devices, optical data storage devices, hard disks, solid state disks (SSDs), and any device capable of storing machine readable instructions, related data, data files, and data structures, and providing the machine readable instructions, the related data, the data files, and the data structures to a processor or a computer to enable the processor or the computer to execute the instructions.

While examples have been described in connection with the drawings, it should be understood that various modifications and changes may be possible from the foregoing disclosure. For example, described techniques may be performed in a sequence different from the described method and/or components such as systems, structures, devices, circuits, etc., may be combined or connected differently from the described method, or replaced with other components or equivalents, and an appropriate result may be achieved.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming apparatus comprising:
a detection device to detect loading of paper output from the image forming apparatus;
a user interface device; a processor; and
a memory to store instructions executable by the processor, wherein the processor, by executing the instructions, is to:
    detect a folded state or an unfolded state of the detection device, display state information indicating a state of the detection device on the user interface device,
    control an operation of an image forming job based on the state information of the detection device and mounting information of an output option device;
    perform a print job, corresponding to a print job request, in a case in which the state information of the detection device indicates the folded state and the mounting information of the output option device indicates a mounted state.

2. The image forming apparatus of claim 1, wherein the processor, by executing the instructions, in a case in which the state information of the detection device indicates the unfolded state and the mounting information of the output option device indicates a mounted state, is to:
display error information indicating an error state regarding the detection device or guide information to guide folding of the detection device, on the user interface device, and
perform a print job corresponding to a print job request in a case in which the detection device is detected as being in the folded state.

3. The image forming apparatus of claim 1, wherein the processor, by executing the instructions, in a case in which the mounting information of the output option device indicates a mounted state and a paper jam occurs in the image forming apparatus, is to:
detect a clearance of the paper jam, and
display mounting notification information of the output option device or guide information to guide folding of the detection device based on the state information of the detection device, on the user interface device.

4. The image forming apparatus of claim 1, wherein the processor, by executing the instructions, in a case in which the mounting information of the output option device indicates a non-mounted state and a paper jam occurs in the image forming apparatus, is to:
detect a clearance of the paper jam,
perform a print job corresponding to a print job request in a case in which the state information of the detection device indicates the unfolded state, and
display guide information to guide unfolding of the detection device on the user interface device in a case in which the state information of the detection device indicates the folded state.

5. The image forming apparatus of claim 1, wherein the detection device comprises:
an actuator to detect loading of paper output from the image forming apparatus; and
a sensor to detect an unfolded state or a folded state of the actuator.

6. The image forming apparatus of claim 5, wherein the detection device comprises:
a first lever coupled to the actuator to rotate and fix the actuator;
a second lever coupled to the sensor for an on or off operation of the sensor; and a bar comprising a first portion coupled to the first lever and a second portion coupled to the second lever.

7. The image forming apparatus of claim 5, wherein the unfolded state of the detection device indicates a state in which the actuator is unfolded toward a stacker tray, and wherein the folded state of the detection device indicates a state in which the actuator is folded away from the stacker tray.

8. The image forming apparatus of claim 5, wherein the processor, by executing the instructions, is to detect the unfolded state or the folded state of the detection device based on a signal obtained from the sensor.

9. The image forming apparatus of claim 1, wherein the processor, by executing the instructions, is to:

detect whether the detection device is in an error state based on the state information of the detection device and mounting information of the output option device, and display error information indicating the error state regarding the detection device or guide information to clear the error state, on the user interface device, in a case in which the detection device is detected as being in the error state.

10. An operating method of an image forming apparatus, the operating method comprising:

detecting a folded state or an unfolded state of a detection device that detects loading of paper output from the image forming apparatus;

displaying state information indicating a state of the detection device; and controlling an operation of an image forming job based on the state information of the detection device and mounting information of an output option device; and performing a print job, corresponding to a print job request, in a case in which the state information of the detection device indicates the folded state and the mounting information of the output option device indicates a mounted state.

11. The operating method of claim 10, wherein, in a case in which the state information of the detection device indicates the unfolded state and the mounting information of the output option device indicates a mounted state, the controlling of the operation of the image forming job comprises:

displaying one of error information indicating an error state regarding the detection device and guide information to guide folding; and performing a print job corresponding to a print job request, in a case in which the detection device is detected as being in the folded state.

12. The operating method of claim 10, wherein, in a case in which the mounting information of the output option device indicates a mounted state and a paper jam occurs in the image forming apparatus, the controlling of the operation of the image forming job comprises:

detecting clearance of the paper jam; and displaying mounting notification information of the output option device or guide information to guide folding of the detection device based on the state information of the detection device.

13. The operating method of claim 10, wherein, in a case in which the mounting information of the output option device indicates a non-mounted state and a paper jam occurs in the image forming apparatus, the controlling of the operation of the image forming job comprises:

detecting clearance of the paper jam;

performing a print job corresponding to a print job request in a case in which the state information of the detection device indicates the unfolded state; and displaying guide information to guide unfolding of the detection device in a case in which the state information of the detection device indicates the folded state.

14. A non-transitory computer-readable storage medium having stored therein instructions executable by an image forming apparatus, the instructions comprising:

instructions to detect a folded state or an unfolded state of a detection device that detects loading of paper output from the image forming apparatus; instructions to display state information indicating a state of the detection device; and instructions to control an operation of an image forming job based on the state information of the detection device and mounting information of an output option device; and instructions to perform a print job, corresponding to a print job request, in a case in which the state information of the detection device indicates the folded state and the mounting information of the output option device indicates a mounted state.

* * * * *